US010505866B2

(12) United States Patent
Lee (10) Patent No.: US 10,505,866 B2
(45) Date of Patent: Dec. 10, 2019

(54) SYSTEM AND METHOD FOR RECOMMENDING HOSTING PLATFORMS FOR USER WORKLOAD EXECUTION

(71) Applicant: ORACLE INTERNATIONAL CORPORATION, Redwood Shores, CA (US)

(72) Inventor: Michael Brian Lee, Roseville, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 237 days.

(21) Appl. No.: 15/631,481

(22) Filed: Jun. 23, 2017

(65) Prior Publication Data

US 2018/0375795 A1    Dec. 27, 2018

(51) Int. Cl.
 H04L 12/911     (2013.01)
 H04L 12/26      (2006.01)
 H04W 24/06      (2009.01)
 G06F 9/50       (2006.01)

(52) U.S. Cl.
 CPC ........ H04L 47/823 (2013.01); H04L 43/0876 (2013.01); H04L 43/50 (2013.01); *G06F 9/50* (2013.01); *G06F 9/505* (2013.01); *H04L 47/822* (2013.01); *H04W 24/06* (2013.01)

(58) Field of Classification Search
 CPC ....... G06F 9/50; G06F 9/505; H04L 43/0876; H04L 43/50; H04L 47/822; H04L 47/823; H04W 24/06
 See application file for complete search history.

(56) References Cited

U.S. PATENT DOCUMENTS

| 7,047,177 | B1* | 5/2006 | Lee ..................... H04L 41/0823 703/22 |
| 8,572,623 | B2* | 10/2013 | Bhogal .................... G06F 9/50 718/1 |
| 9,098,364 | B2* | 8/2015 | Davis ....................... G06F 8/60 |
| 2006/0074970 | A1* | 4/2006 | Narayanan .......... G06F 11/3419 |
| 2008/0134176 | A1* | 6/2008 | Fitzgerald ........... G06F 9/45537 718/1 |

(Continued)

*Primary Examiner* — Joe Chacko
(74) *Attorney, Agent, or Firm* — Kraguljac Law Group, LLC (57) ABSTRACT

Systems, methods, and other embodiments associated with recommending hosting platforms for user workload execution are described. In one embodiment, a method includes replicating a user workload to generate a test workload. The example method may also include collecting execution statistics of the user workload executing on a first hosting platform and the test workload executing on a second hosting platform. The example method may also include comparing the execution statistics with first features of the first hosting platform and second features of the second hosting platform. In response to the execution statistics matching the second features to a greater degree than the first features, a recommendation is generated to execute the user workload on the second hosting platform. The example method may also include transmitting the recommendation over a computer network to a remote computer for display to a user on a display of the remote computer.

19 Claims, 7 Drawing Sheets

(56) References Cited

U.S. PATENT DOCUMENTS

| | | | | |
|---|---|---|---|---|
| 2012/0185868 A1* | 7/2012 | Bartfai-Walcott | ...... | G06F 9/445 |
| | | | | 718/105 |
| 2013/0339528 A1* | 12/2013 | Niemoeller | ....... | H04L 29/08297 |
| | | | | 709/226 |
| 2014/0047095 A1* | 2/2014 | Breternitz | ............. | G06F 9/5072 |
| | | | | 709/224 |
| 2014/0068053 A1* | 3/2014 | Ravi | ..................... | G06F 9/5072 |
| | | | | 709/224 |

* cited by examiner

SYSTEM AND METHOD FOR RECOMMENDING HOSTING PLATFORMS FOR USER WORKLOAD EXECUTION

BACKGROUND

Workloads are deployed to hosting platforms for execution, such as to a distributed computing environment or cloud service. In an example, a user deploys a database or application to a hosting platform for remote execution by computing devices of the hosting platform. There are a wide variety of hosting platforms that could be selected by the user. Each hosting platform may provide a different set of features or varying levels of such features. For example, a first hosting platform may provide users with access to shared resources at a low cost. A second hosting platform may provide users with resources that are optimized for high I/O utilization at a higher cost than the first hosting platform. A third hosting platform may provide users with resources that are optimized for high memory utilization at a higher cost than the first hosting platform.

Because most users are unaware of the vast features provided by the many available hosting platforms, a user typically has randomly selected a hosting platform or the user may merely choose to use the first hosting platform due to one characteristic (e.g., cost savings). Unfortunately, the user may deploy user workloads to the first hosting platform that could have otherwise benefited from the I/O and memory features provided by the second hosting platform or the third hosting platform.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that provide for recommending hosting platforms for user workload execution. A variety of hosting platforms, such as cloud services, are available for a user to deploy user workloads for execution. Unfortunately, the user may not have in-depth information relating to features provided by such hosting platforms and how such features will result in actual benefits for a user workload. Accordingly, a platform analysis module is configured to replicate the user workload as test workloads that are executed on a plurality of hosting platforms. Execution statistics of the user workload and the test workloads are collected from the hosting platforms.

The execution statistics are compared with features provided by the hosting platforms. A recommended hosting platform that provides features that match the execution statistics to a greater degree than features of other hosting platforms is determined. Accordingly, a recommendation is generated and provided to the user for deploying the user workload to the recommended hosting platform. In this way, the user workload benefits from using the recommended hosting platform that may provide security, I/O optimization, memory usage optimization, redundancy, high availability, affordability, reporting tools, diagnostic tools, compression, deduplication, encryption, or other features that match feature usage by the user workload.

Figure 1:
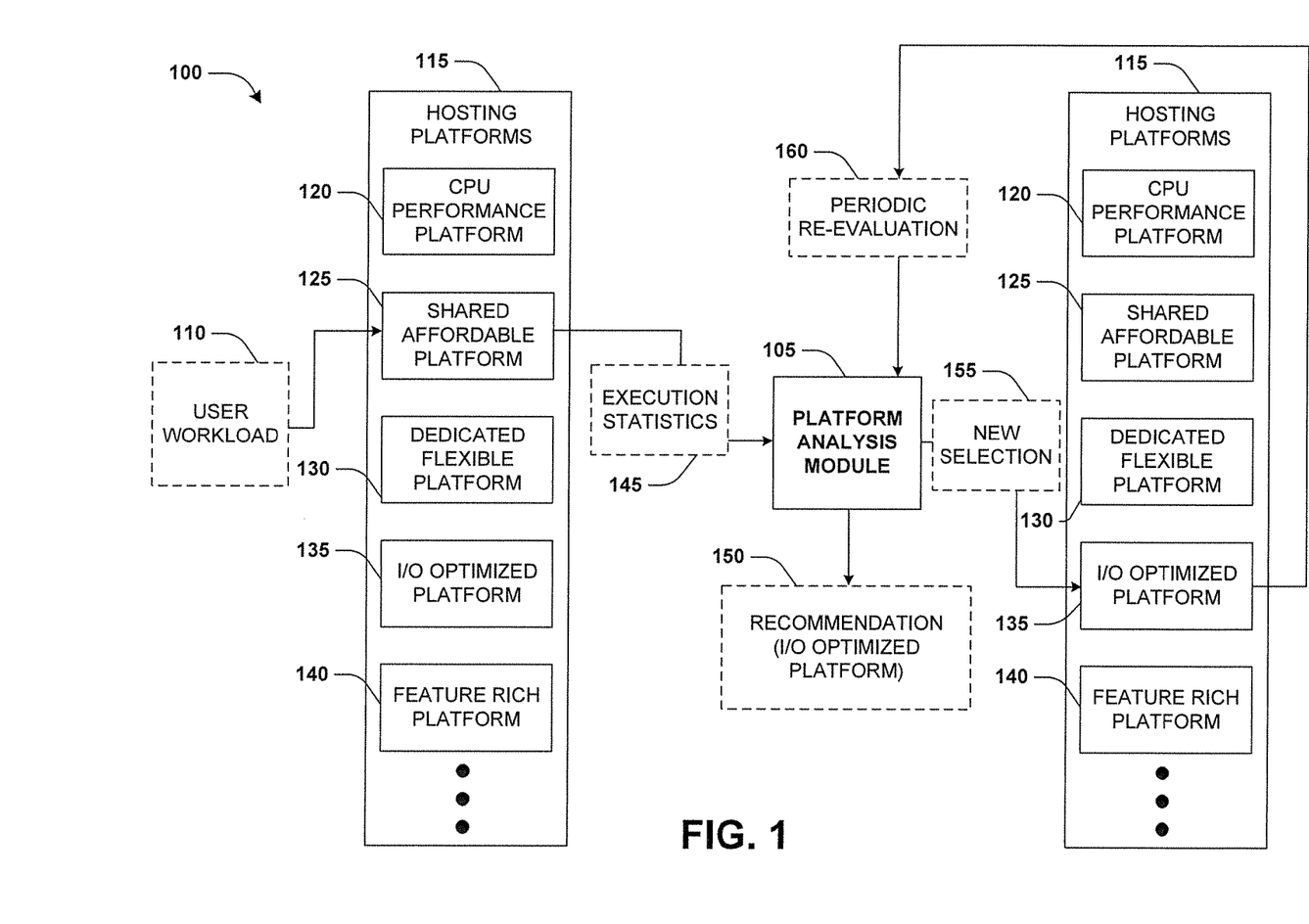
FIG. 1 illustrates an embodiment of a system associated with recommending hosting platforms for user workload execution.

With reference to FIG. 1, one embodiment of a computer system 100 associated with recommending hosting platforms for user workload execution is illustrated. The system 100 includes a platform analysis module 105, which can be configured to execute on a computer, such as computer 515 of FIG. 5. In one embodiment, the platform analysis module 105 is implemented on a computing device external to a user computing device of a user that has a user workload to deploy to a hosting platform and/or external to the hosting platform. The platform analysis module 105 can communicate with the user computing device and/or hosting platform over a communication network. In other embodiments, the platform analysis module 105 is implemented within the user computing device or within the hosting platform. The platform analysis module 105 can communicate with another computer over the communication network, such as from the hosting platform to the user computing device or from the user computing device to the hosting platform. The hosting platform can comprise a distributed computing environment, such as a cloud service comprising servers capable of remotely executing user workloads, such as databases and application, from users.

The platform analysis module 105 is configured to identify a user workload 110 of a user. The user workload 110 can comprise an application, a database, a service, a web server, or any other computer executable code for performing an executable task. The user initially chooses a hosting platform from a plurality of hosting platforms 115 for executing the user workload 110. In one embodiment, the user chooses a shared affordable hosting platform 125 that will execute the user workload 110 with user workloads of other users utilizing shared resources at an affordable cost. Unfortunately, the user may lack information relating to features provided by other hosting platforms, such as a CPU performance hosting platform 120, a dedicated flexible hosting platform 130, an I/O optimized hosting platform 135, a feature rich hosting platform 140, and/or other hosting platforms. The CPU performance hosting platform 120 provides relatively higher CPU performance than other hosting platforms. The dedicated flexible hosting platform 130 provides dedicated resources and/or resources used to provide high availability and/or redundancy that are not shared with other user workloads. The I/O optimized hosting platform 135 provides relatively higher I/O performance than other hosting platforms. The feature rich hosting platform 140 provides relatively higher levels of features, such as improved security, reporting tools, diagnostics, etc.

Accordingly, the platform analysis module 105 is configured to collect execution statistics 145 of the user workload 110 being executed by the shared affordable hosting platform 125. In one embodiment, the platform analysis module 105 may replicate the user workload 110 as test workloads that are executed on other hosting platforms for which the execution statistics 145 are collected. In this way, CPU usage, I/O usage, memory usage, a count of executing processes, a spike trend of computing resource usage, a steady trend of computing resource usage, a security setting, a redundancy setting, a reporting setting, a diagnostic setting, and/or other features used or requested by the user workload 110 and/or test workloads are collected as the execution statistics 145.

The platform analysis module 105 compares the execution statistics 145 with features provided by each hosting platform to identify a hosting platform that provides features that match the execution statistics 145 to a greater degree than other hosting platforms. The features of the hosting platforms 115 are either predefined by the hosting platforms 115 or are identifiable by the platform analysis module 105 by evaluating the execution statistics 145 from test workloads executed on such hosting platforms. In one embodiment, the execution statistics 145 indicate improved I/O performance of a test workload executed on the I/O optimized hosting platform 135 compared to execution statistics 145 of I/O performance of test workloads and the user workload 110 on other hosting platforms. In another embodiment, the execution statistics 145 indicate that in-depth diagnostic tool reporting was provided for a test workload executed on the feature rich hosting platform 140 compared to execution statistics 145 of diagnostic tool reporting for test workloads and the user workload 110 on other hosting platforms. In this way, features of the hosting platforms are either predefined or are determined by the platform analysis module 105 by evaluating the execution statistics 145.

In one embodiment, the platform analysis module 105 determines that the execution statistics 145 match features of the I/O optimized hosting platform 135 to a greater degree than features provided by other hosting platforms. The execution statistics 145 indicate that the user workload 110 and/or test workloads perform a substantial amount of I/O and that the I/O optimized hosting platform 135 provides improve I/O optimization. Accordingly, the platform analysis module 105 generates a recommendation 150 to switch the execution of the user workload 110 from the shared affordable hosting platform 125 to the I/O optimized hosting platform 135. In one embodiment, the platform analysis module 105 automatically switches 155 the user workload 110 to the I/O optimized hosting platform 135. Because the user workload 110 can change over time, such as an increased CPU feature utilization, periodic re-evaluations 160 are performed to identify whether a current hosting platform or a different hosting platform, such as the CPU performance hosting platform 120 provide features better matching the new feature utilization of the user workload 110.

In one embodiment, the user workload 110 is evaluated to determine that the user workload 110 is making connections to other known workloads, such as workloads having a same account or linked accounts where such workloads are communicating data between one another. Recommendations can be made for optimizing the user workload 110 with a known workload. In one embodiment, a recommendation of which hosting platforms to use for hosting multiple associated workloads is provided, such as where each associated workload is part of a bundled package of workloads (a 'la cart workload services that can be bundled to improve costs associated with hosting the associated workloads).

Figure 2:
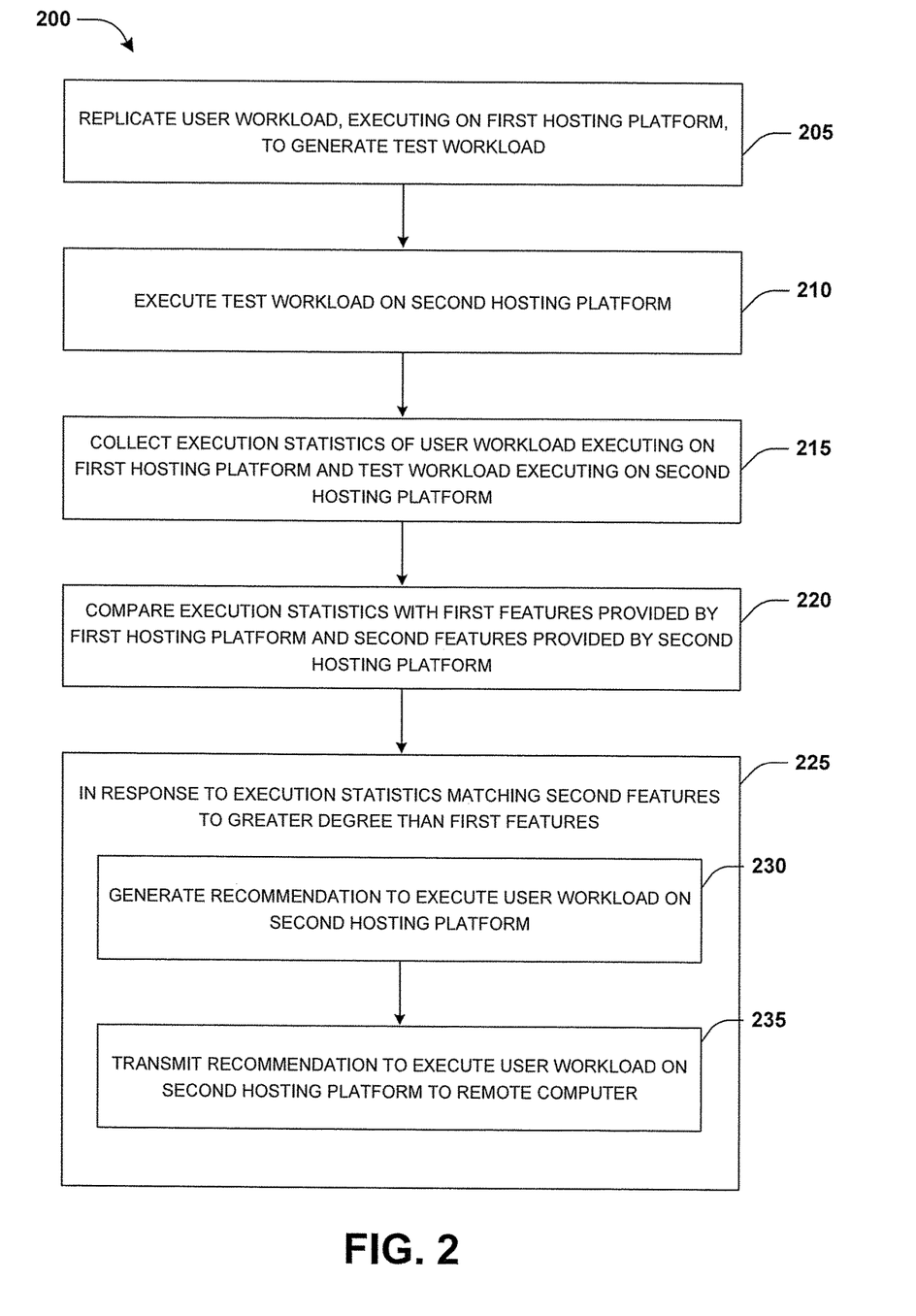
FIG. 2 illustrates an embodiment of a method associated with recommending hosting platforms for user workload execution.

With reference to FIG. 2, one embodiment of a computer implemented method 200 associated with recommending hosting platforms for user workload execution is illustrated. In one embodiment, the method 200 is performed by the platform analysis module 105 utilizing various computing resources of the computer 515, such as the processor 520 for executing instructions associated with collecting and comparing execution statistics for making recommendations. Memory 535 and/or disks 555 are used for storing execution statistics, recommendations, and/or other data. Network hardware is used for communicating data structures and/or other data between the computer 515 and remote computers over a network, such as between a user computing device, a hosting platform, etc. The method 200 is triggered upon a command to evaluate hosting platforms for identify a hosting platform suitable to host a user workload.

Figure 3A:
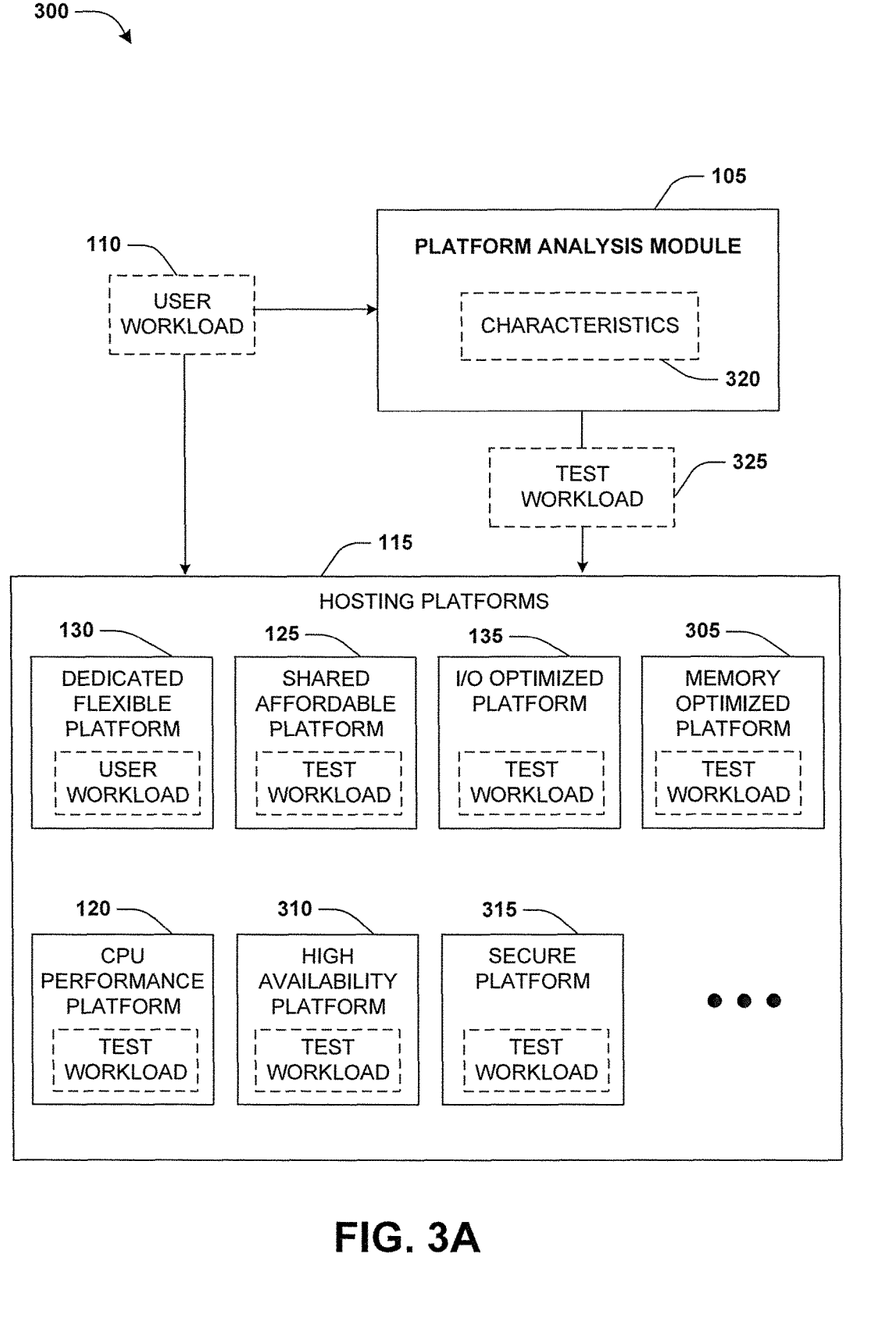
FIG. 3A illustrates an embodiment of a system associated with recommending hosting platforms for user workload execution, where test workloads are deployed to hosting platforms.

At 205, a user workload 110 is replicated to create a test workload 325, as illustrated by example system 300 of FIG. 3A. The user workload 110 comprises computer executable code for performing an executable task, such as an application, a web service, a database, etc. The user workload 110 is executing on a first hosting platform, such as a dedicated flexible platform 130 that provides dedicated resources to the user workload 110 that are not shared with other user workloads. In one embodiment of replicating the user workload 110, characteristics 320 of the user workload 110 are identified. The characteristics 320 can comprise information regarding database data, database tables, database routines, application functions and program modules, and/or other data, functionality, or data structures used by the user workload 110. The test workload 325 is generated based upon the characteristics 320 of the user workload 110 so that the execution of the test workload 325 may involve similar resource and feature utilization as the user workload 110.

At 210, the test workload 325 is executed on a second hosting platform and/or other hosting platforms. In one embodiment, the test workload 325 is executed on a shared affordable hosting platform 125, an I/O optimized hosting platform 135, a memory optimized hosting platform 305, a CPU performance hosting platform 120, a high availability hosting platform 310, a secure hosting platform 315, and/or a variety of other hosting platforms. In one embodiment where the hosting platforms 115 provide information describing features provided by such hosting platforms 115, the platform analysis module 105 may merely monitor execution statistics of the user workload 110 without generating and deploying test workloads because the platform analysis module 105 can compare the described features of the hosting platforms with the execution statistics of the user workload 110 to determine which hosting platform to recommend.

Figure 3B:
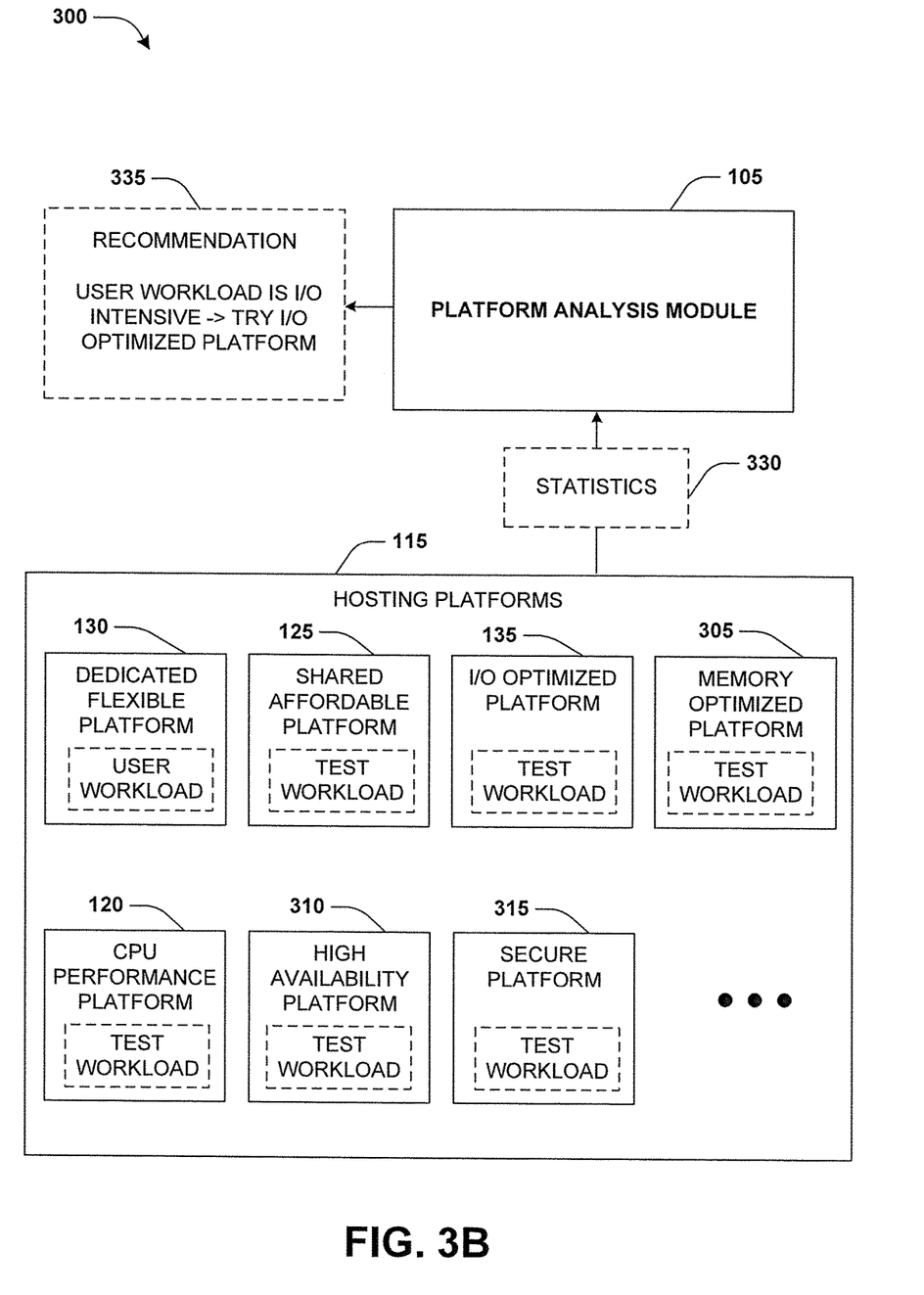
FIG. 3B illustrates an embodiment of a system associated with recommending hosting platforms for user workload execution, where a recommendation is provided.

At 215, execution statistics 330 of the user workload 110 executing on the first hosting platform and/or the test workload 325 executing on the second hosting platform are collected, as illustrated by example system 300 of FIG. 3B. In one embodiment, the execution statistics 330 are collected for the user workload 110 executing on the dedicated flexible hosting platform 130 and the test workload 325 executing on the shared affordable hosting platform 125, the I/O optimized hosting platform 135, the memory optimized hosting platform 305, the CPU performance hosting platform 120, the high availability hosting platform 310, the secure hosting platform 315, and/or the variety of other hosting platforms. In one embodiment, background processes are executed within the hosting platforms 115 to collect the execution statistics 330.

At 220, the execution statistics 330 are compared with first features provided by the first hosting platform and second features provided by the second hosting platform. In one embodiment, the first features are derived from a portion of the execution statistics 330 corresponding to execution of the user workload 110 on the first hosting platform. The second features are derived from a portion of the execution statistics 330 corresponding to execution of the test workload 325 on the second hosting platform. In another embodiment, the execution statistics 330, indicative of features used by the user workload 110, are mapped to features of the hosting platforms 115. In another embodiment, first execution statistics of the user workload 110 and second execution statistics of the test workload 325 are evaluated to determine that the user workload 110 has a feature utilization. The feature utilization may correspond to features requested or actually used by the user workload 110, such as CPU usage, I/O usage, memory usage, security feature usage, redundancy feature usage, high availability feature usage, deduplication feature usage, compression feature usage, a count of running processes, reporting feature usage, diagnostic feature usage, etc.

In one embodiment, the execution statistics 330 comprise information collected by a background process regarding the execution of the user workload 110 on the dedicated flexible hosting platform 130. Such information may indicate that the user workload 110 is I/O intensive and does not fully utilize dedicated flexible resource features provided by the dedicated flexible hosting platform 130. The execution statistics 330 comprise information collected by other background processes regarding execution of the test workload 325 on the shared affordable hosting platform 125, the I/O optimized hosting platform 135, the memory optimized hosting platform 305, the CPU performance hosting platform 120, the high availability hosting platform 310, the secure hosting platform 315, and/or the variety of other hosting platforms. Such information may indicate how the instances of the test workload 325 utilize features of the hosting platforms 115 and/or what features and levels of such features are provided by the hosting platforms 115 (e.g., memory performance, I/O performance, latency, security features, deduplication features, reporting features, diagnostic features, etc.).

At 225, the execution statistics 330 are determined as matching the second features of the second hosting platform to a greater degree than the first features of the first hosting platform. Various features requested or used by the user workload 110 and/or the test workload 325 are compared with features provided by the hosting platforms 115. In one embodiment, memory utilization by the user workload 110 and/or the test workload 325 is compared with memory performance provided by the hosting platforms 115. In another embodiment, I/O utilization by the user workload 110 and/or the test workload 325 is compared with I/O performance provided by the hosting platforms 115. In another embodiment, data security feature settings of the user workload 110 and/or the test workload 325 (e.g., the use of encrypted data, sensitive data, write once read many (WORM data, the implementation of security policies, etc.) are compared with data security features provided by the hosting platforms 115.

In another embodiment, data availability feature settings of the user workload 110 and/or the test workload 325 are compared with data availability features provided by the hosting platforms 115. A data availability feature setting can correspond to a recovery point objective (RPO) as an amount of data in terms of time that can be lost due to a service interruption or failure, such as data loss beyond 5 seconds preceding a service interruption or failure as being unacceptable. A data availability feature setting can correspond to a recovery time objective (RTO) as a maximum amount of time of a lack of access to data that is tolerated, such as an allowance of up to 15 seconds from a service interruption or failure to a time where data is available again.

In another embodiment, redundancy settings of the user workload 110 and/or the test workload 325 (e.g., a RAID level, a count of duplicate copies that are maintained of data, etc.) are compared with redundancy features provided by the hosting platforms 115. In another embodiment, diagnostic tool settings of the user workload 110 and/or the test workload 325 (e.g., a database diagnostic tool, an application debug tool, etc.) are compared with diagnostic tool features provided by the hosting platforms 115. In another embodiment, reporting tool settings of the user workload 110 and/or the test workload 325 (e.g., generating reports regarding the execution of an application, a database, etc.) are compared with reporting tool features provided by the hosting platforms 115. In another embodiment, cost features of the hosting platforms 115 are taken into account, such as where a hosting platform that provides a threshold level of performance used by the user workload 110 (e.g., an adequate amount of performance and resources) at a lower cost than other hosting platforms may be recommended.

In one embodiment of creating a recommendation 335, the execution statistics indicate 330 that the user workload 110 could benefit from improved I/O optimization features provided by the I/O optimized hosting platform 135 and does not fully utilize dedicated flexible resource features provided by the dedicated flexible platform 130. At 330, the recommendation 335 is generated to recommend execution of the user workload 110 on the I/O optimized hosting platform 135. The recommendation 335 is provided to the user, such as over a computer network to a remote computer for display to the user on a display of the remote computer.

In one embodiment, a feature comparison chart of features provided by the hosting platforms 115 is constructed based upon the execution statistics 330. The feature comparison chart may specify CPU performance, memory performance, I/O performance, security features, encryption features, deduplication features, reporting tool features (e.g., database reporting tools), data availability features (e.g., an amount of time to recover from a failure), diagnostic tool features (e.g., application debugging features), redundancy features (e.g., a RAID level), cost features, and/or other features of the hosting platforms 115. Features used by the user workload 110 may be incorporated into the feature comparison chart. The feature comparison chart may be displayed to the user for user selection of a hosting platform to execute the user workload 110.

In one embodiment, the platform analysis module 105 automatically reassigns the user workload 110 between hosting platforms, such as from the dedicated flexible hosting platform 130 to the I/O optimized hosting platform 135.

In one embodiment where the execution statistics 330 are determined as matching the first features of the first hosting platform to a greater degree than the second features of the second hosting platform, a different recommendation is generated to recommend maintaining execution of the user workload 110 on the first hosting platform.

Figure 3C:
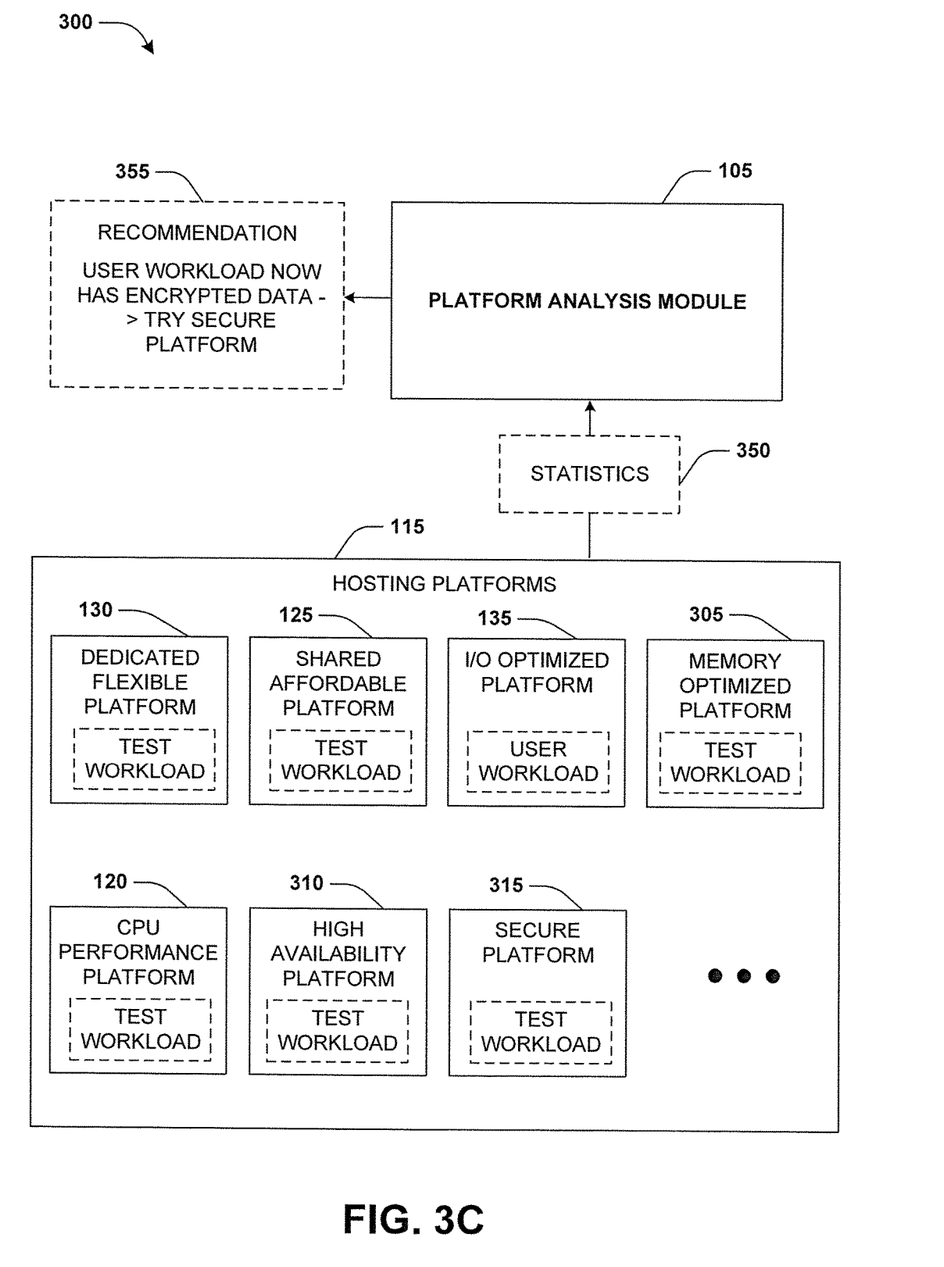
FIG. 3C illustrates an embodiment of a system associated with recommending hosting platforms for user workload execution, where a recommendation is provided.

FIG. 3C illustrates the platform analysis module 105 periodically generating and executing test workloads on the hosting platforms 115 to collect updated execution statistics 350 regarding execution of the user workload 110 and the test workloads. In one embodiment, the user workload 110 is executing on the I/O optimized hosting platform 135 based upon the recommendation 335. The updated execution statistics 350 may be evaluated to determine that feature utilization by the user workload 110 has changed to a new feature utilization, such as a change from heavy I/O usage to the storage and processing of encrypted data that would benefit from using a hosting platform with improved security compared to the I/O optimized hosting platform 135. In one embodiment, the user may specify that the user workload 110 is now using more sensitive data that would benefit from improved security. Accordingly, the platform analysis module 105 generates and provides a recommendation 355 to the user to execute the user workload 110 on the secure hosting platform 315.

In one embodiment, a workload is hosted on a first hosting platform. A statistic scripting tool or other statistic collection functionality can be deployed on the first hosting platform in order to collect statistics regarding the execution of the workload, such as real-time collection of data regarding database workflows such as by an automatic workload repository. In one embodiment, a periodic script scans logs created by the statistic collection functionality to identify a ratio of memory to CPU hits or any other statistics to see if a different hosting platform would be a better fit. The logs can store statistics over time, which can be used to capture spikes of usage that would otherwise not show up in short tests, and thus workload analysis can determine whether a flat rate pricing or a variable rate pricing is a more cost effective plan for hosting the workload.

A hosting platform may comprise a web service, a server, hardware, a software environment, a mobile platform, an operating system, a cloud environment, a tier of tiered storage, an application, a virtual machine, a file system, a graphics processing unit, a Neural processing environment, an artificial intelligence environment, a Hadoop environment, a wearable device platform, an augmented reality platform, or any other type of environment or combination thereof that can process data and/or workloads.

Figure 4:
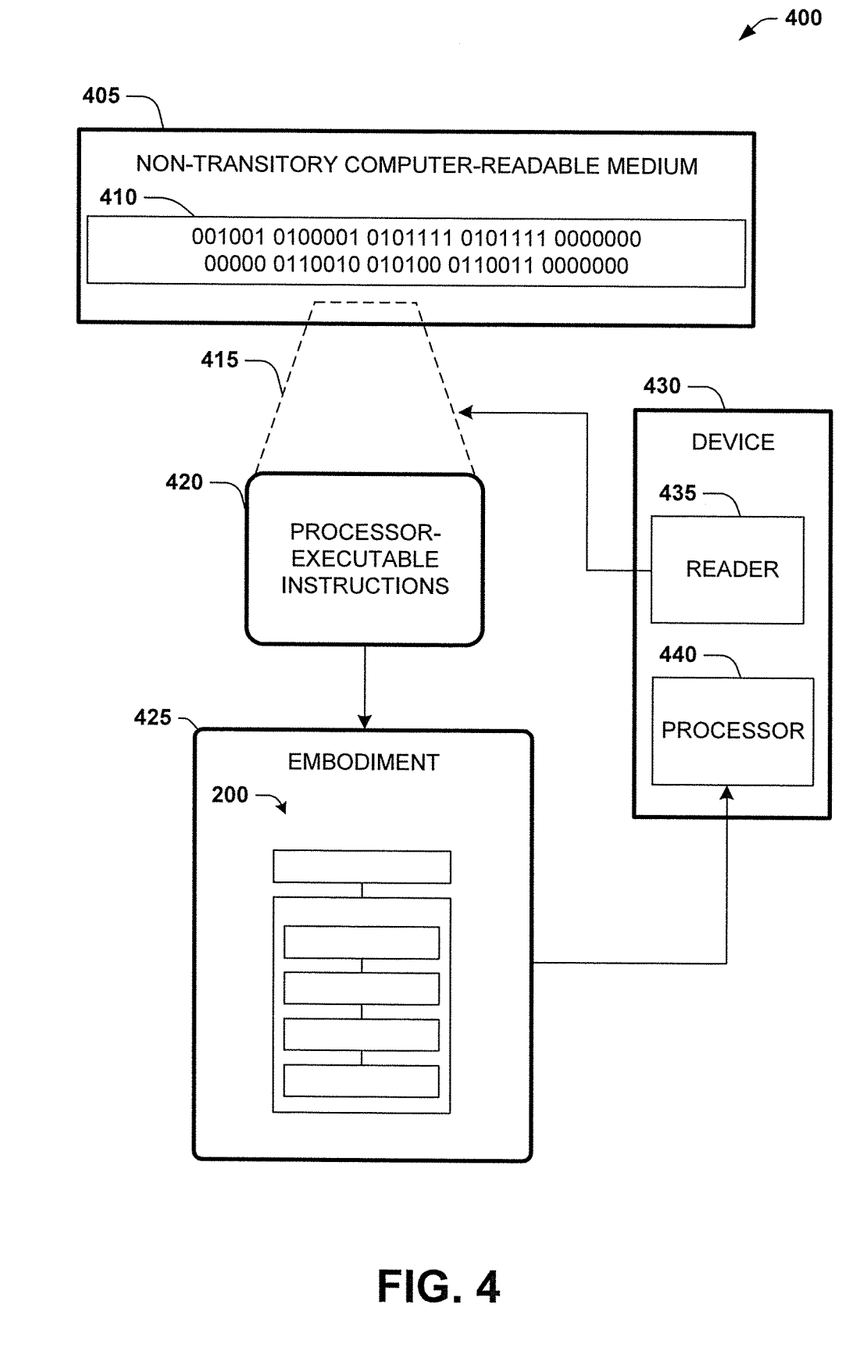
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the platform analysis module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the, functionality of the platform analysis module 105, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1, for example.

Figure 5:
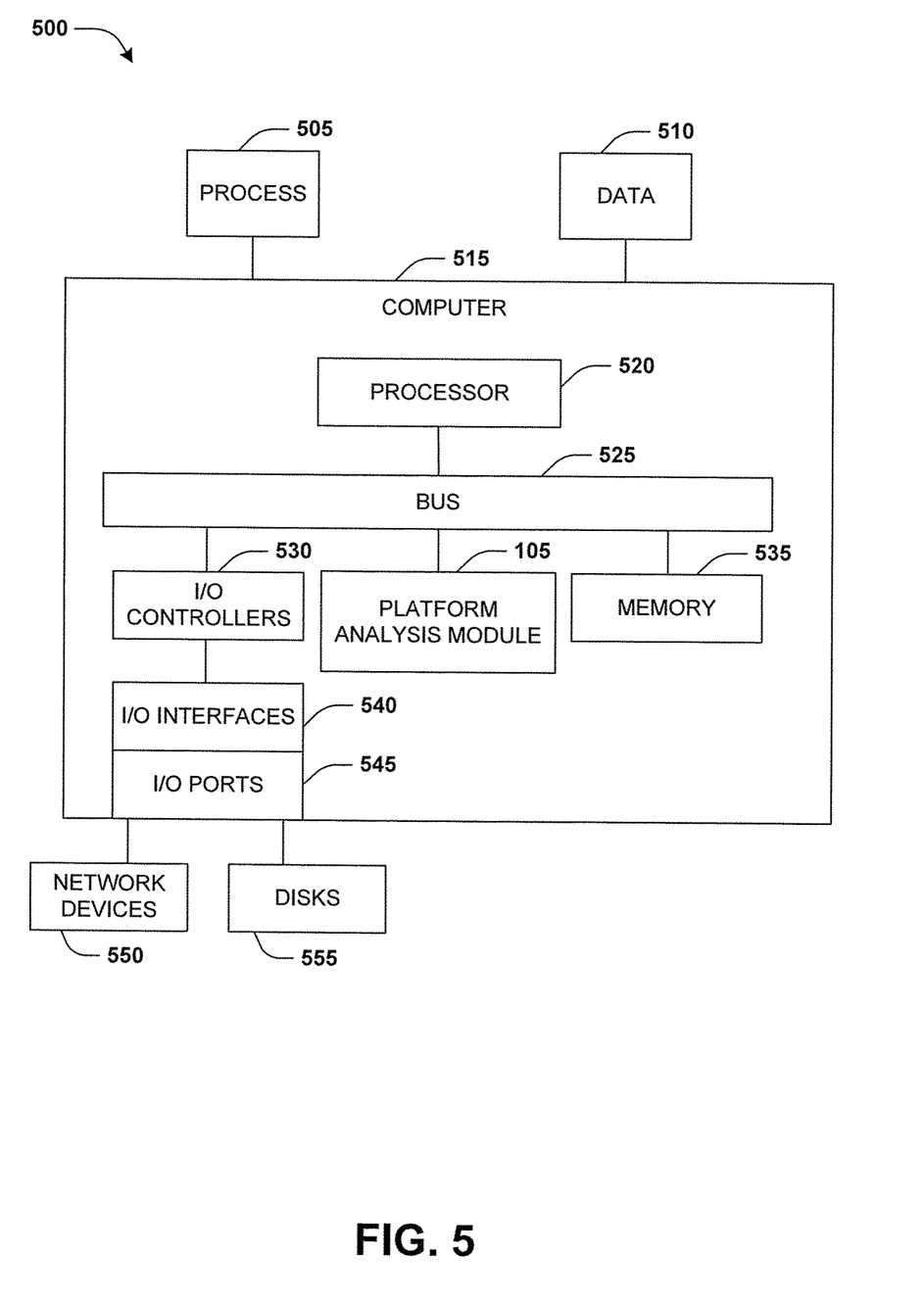
FIG. 5 illustrates an embodiment of a computing system configured with the example systems and/or methods disclosed.

FIG. 5 illustrates an example computing device 500 that is configured and/or programmed with one or more of the example systems and methods described herein, and/or equivalents. The example computing device 500 may be the computer 515 that includes a processor 520, a memory 535, and I/O ports 545 operably connected by a bus 525. In one embodiment, the, the computer 515 may include logic of the platform analysis module 105 configured to facilitate the system 100 and/or the method 200 shown in FIGS. 1-2. In different embodiments, the logic of the platform analysis module 105 may be implemented in hardware, a non-transitory computer-readable medium 505 with stored instructions, firmware, and/or combinations thereof. While the logic of the platform analysis module 105 is illustrated as a hardware component attached to the bus 525, it is to be appreciated that in other embodiments, the logic of the platform analysis module 105 could be implemented in the processor 520, stored in memory 535, or stored in disk 555.

In one embodiment, logic of the platform analysis module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the platform analysis module 105 may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multi-processor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with input/output (I/O) devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer causes the processor to:
   replicate a user workload to generate a test workload, wherein the user workload comprises computer executable code for performing an executable task, and wherein the user workload is executing on a first hosting platform;
   wherein the instructions to replicate the user workload comprise instructions to:
   (i) evaluate the user workload to identify characteristics of the user workload; and
   (ii) generate the test workload based upon the characteristics of the user workload;
   execute the test workload on a second hosting platform;
   collect execution statistics of the user workload executing on the first hosting platform and the test workload executing on the second hosting platform;
   wherein the instructions to collect execution statistics comprise instructions to:
   (i) execute a first background process within the first hosting platform to collect first execution statistics regarding execution of the user workload by the first hosting platform; and
   (ii) execute a second background process within the second hosting platform to collect second execution statistics regarding execution of the test workload by the second hosting platform;
   compare the first execution statistics with first features provided by the first hosting platform and compare the second execution statistics with second features provided by the second hosting platform to determine that the user workload has a feature utilization; and
   in response to the second features of the second hosting platform matching the feature utilization to a greater degree than the first features of the first hosting platform:
   (i) generate the recommendation to execute the user workload on the second hosting platform, and
   (ii) transmit the recommendation over a computer network to a remote computer for display to a user on a display of the remote computer.

2. The non-transitory computer-readable medium of claim 1 wherein the computer-executable instructions comprise computer-executable instructions to cause the processor to:
   in response to the execution statistics matching the first features to a greater degree than the second features:
   (i) generate a second recommendation to retain execution of the user workload on the first hosting platform; and
   (ii) transmit the second recommendation over the computer network to the remote computer for display to the user on the display of the remote computer.

3. The non-transitory computer-readable medium of claim 1, wherein the computer-executable instructions comprise computer-executable instructions to cause the processor to:
   evaluate the execution statistics to determine that the feature utilization of the user workload has a memory feature utilization; and
   in response to the second features of the second hosting platform matching the memory feature utilization to a greater degree than the first features of the first hosting platform, generate and transmit the recommendation to execute the user workload on the second hosting platform based upon the memory feature utilization.

4. The non-transitory computer-readable medium of claim 1, wherein the computer-executable instructions comprise computer-executable instructions to cause the processor to:
   evaluate the execution statistics to determine that the feature utilization of the user workload has an I/O feature utilization; and
   in response to the second features of the second hosting platform matching the I/O feature utilization to a greater degree than the first features of the first hosting platform, generate and transmit the recommendation to execute the user workload on the second hosting platform based upon the I/O feature utilization.

5. The non-transitory computer-readable medium of claim 1 wherein the computer-executable instructions comprise computer-executable instructions to cause the processor to:
evaluate the execution statistics to determine that the feature utilization of the user workload has a data security feature setting; and
in response to the second features of the second hosting platform matching the data security feature setting to a greater degree than the first features of the first hosting platform, generate and transmit the recommendation to execute the user workload on the second hosting platform based upon the data security feature setting.

6. The non-transitory computer-readable medium of claim 1, wherein the computer-executable instructions comprise computer-executable instructions to cause the processor to:
evaluate the execution statistics to determine that the feature utilization of the user workload has a data availability feature setting; and
in response to the second features of the second hosting platform matching the data availability feature setting to a greater degree than the first features of the first hosting platform, generate and transmit the recommendation to execute the user workload on the second hosting platform based upon the data availability feature setting.

7. A computing system, comprising:
a processor connected to memory; and
a platform analysis module stored on a non-transitory computer readable medium and configured with instructions that when executed by the processor cause the processor to:
replicate a user workload to generate a test workload including (i) evaluate the user workload to identify characteristics of the user workload, and (ii) generate the test workload based upon the characteristics of the user workload, wherein the user workload comprises computer executable code for performing an executable task, and wherein the user workload is executing on a first hosting platform;
execute the test workload on a second hosting platform;
collect execution statistics by:
(i) executing a first background process within the first hosting platform to collect first execution statistics regarding execution of the user workload by the first hosting platform; and
(ii) executing a second background process within the second hosting platform to collect second execution statistics regarding execution of the test workload by the second hosting platform;
compare the first execution statistics with first features provided by the first hosting platform and compare the second execution statistics with second features provided by the second hosting platform to determine that the user workload has at least a feature utilization; and
in response to the second features of the second hosting platform matching the feature utilization to a greater degree than the first features of the first hosting platform:
(i) generate a recommendation to execute the user workload on the second hosting platform; and
(ii) transmit the recommendation over a computer network to a remote computer for display to a user on a display of the remote computer.

8. The computing system of claim 7, wherein the instructions comprise instructions that cause the processor to:
evaluate the execution statistics to determine that the feature utilization of the user workload has a redundancy feature setting; and
in response to the second features of the second hosting platform matching the redundancy feature setting to a greater degree than the first features of the first hosting platform, generate and transmit the recommendation to execute the user workload on the second hosting platform based upon the redundancy feature setting.

9. The computing system of claim 7, wherein the instructions comprise instructions that cause the processor to:
evaluate the execution statistics to determine that the feature utilization of the user workload has a diagnostic tool feature setting; and
in response to the second features of the second hosting platform matching the diagnostic tool feature setting to a greater degree than the first features of the first hosting platform, generate and transmit the recommendation to execute the user workload on the second hosting platform based upon the diagnostic tool feature setting.

10. The computing system of claim 7, wherein the instructions comprise instructions that cause the processor to:
evaluate the execution statistics to determine that the feature utilization of the user workload has a reporting tool feature setting; and
in response to the second features of the second hosting platform matching the reporting tool feature setting to a greater degree than the first features of the first hosting platform, generate and transmit the recommendation to execute the user workload on the second hosting platform based upon the reporting tool feature setting.

11. The computing system of claim 7, wherein the instructions comprise instructions that cause the processor to:
in response to determining that the second hosting platform provides a threshold level of performance used by the user workload at a lower cost feature than the first hosting platform, generate and transmit the recommendation to execute the user workload on the second hosting platform.

12. The computing system of claim 7, wherein the user workload and the test workload are at least one of database applications or applications.

13. The computing system of claim 7, wherein the instructions comprise instructions that cause the processor to:
periodically generate and execute test workloads on a plurality of hosting platforms to collect updated execution statistics indicating that the feature utilization by the user workload has changed to a new feature utilization; and
in response to the new feature utilization matching features of a first hosting platform to a greater degree than features of other hosting platforms of the plurality of hosting platforms:
(i) generate a second recommendation to execute the user workload on the first hosting platform; and
(ii) transmit the second recommendation over a computer network to the remote computer for display to the user on the display of the remote computer.

14. The computing system of claim 7, wherein the instructions comprise instructions that cause the processor to:
construct a feature comparison chart of features provided by the first hosting platform and the second hosting platform; and
display the feature comparison chart and recommendation through the display of the computing device.

15. A computer-implemented method, the computer-implemented method involving a computing device comprising a processor, and the computer-implemented method comprising:
  replicate, by the processor, a user workload to generate a test workload including (i) evaluate the user workload to identify characteristics of the user workload, and (ii) generate the test workload based upon the characteristics of the user workload, wherein the user workload comprises computer executable code for performing an executable task, and wherein the user workload is executing on a first hosting platform;
  execute, by the processor, the test workload on a second hosting platform;
  collect, by the processor, execution statistics by:
    (i) executing a first background process within the first hosting platform to collect first execution statistics regarding execution of the user workload by the first hosting platform; and
    (ii) executing a second background process within the second hosting platform to collect second execution statistics regarding execution of the test workload by the second hosting platform;
  compare, by the processor, the first execution statistics with first features provided by the first hosting platform and compare the second execution statistics with second features provided by the second hosting platform to determine that the user workload has at least a feature utilization; and
  in response to the second features of the second hosting platform matching the feature utilization to a greater degree than the first features of the first hosting platform:
    (i) generate, by the processor, a recommendation to execute the user workload on the second hosting platform; and
    (ii) transmit, by the processor, the recommendation over a computer network to a remote computer for display to a user on a display of the remote computer.

16. The computer-implemented method of claim 15, wherein an execution statistic comprises at least one of CPU usage, I/O usage, or memory usage.

17. The computer-implemented method of claim 15, wherein an execution statistic comprises a count of executing processes, a spike trend of computing resource usage, or a steady trend of computing resource usage.

18. The computer-implemented method of claim 15, further comprising:
  in response to the execution statistics matching the second features to a greater degree than the first features, reassign, by the processor, the user workload from the first hosting platform to the second hosting platform.

19. The computer-implemented method of claim 15, further comprising: map, by the processor, the execution statistics to features provided by a plurality of hosting platforms to identify a target hosting platform to recommend for hosting the user workload.

* * * * *

UNITED STATES PATENT AND TRADEMARK OFFICE
CERTIFICATE OF CORRECTION

| | |
|---|---|
| PATENT NO. | : 10,505,866 B2 |
| APPLICATION NO. | : 15/631481 |
| DATED | : December 10, 2019 |
| INVENTOR(S) | : Lee |

Page 1 of 1

It is certified that error appears in the above-identified patent and that said Letters Patent is hereby corrected as shown below:

In the Claims

In Column 12, Lines 33-34, in Claim 2, delete "claim 1" and insert -- claim 1, --, therefor.

In Column 13, Lines 1-2, in Claim 5, delete "claim 1" and insert -- claim 1, --, therefor.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*